United States Patent Office 3,432,556
Patented Mar. 11, 1969

3,432,556
PROCESS FOR PRODUCING ACETONE
Yukio Igarashi, Niigata-shi, Makoto Komatsu, Tokyo, and Susumu Fujiyama and Kazuo Okamoto, Niigata-shi, Japan, assignors to Japan Gas-Chemical Company, Inc., Tokyo, Japan, a corporation of Japan
No Drawing. Filed Sept. 30, 1964, Ser. No. 400,575
Claims priority, application Japan, Sept. 30, 1963, 38/52,880
U.S. Cl. 260—597      11 Claims
Int. Cl. C07c 49/08

ABSTRACT OF THE DISCLOSURE

A process for producing acetone from propylene which comprises introducing gaseous propylene alone or together with an oxygen containing gas into an acidic aqueous solution containing mercuric ions, nitrate ions and ferric ions as a catalyst, and oxidizing the propylene to acetone selectively in liquid phase. The ratio of nitrate ions to mercuric ions is from 20:1 to 300:1 and the ratio of ferric ions to mercuric ions is from 0.01:1 to 0.1:1.

---

This invention relates to a process for producing acetone from propylene.

It is well known that acrolein can be produced from propylene by the reaction via an addition product of propylene with a mercury salt. The reaction is conventionally carried out in a sulfuric acid acidic aqueous solution of mercuric sulfate. On the other hand, British Patent No. 898,790 discloses a reaction for producing acetone from propylene via a complex of propylene with a metal salt such as platinum, palladuim, iridium, ruthenium and rhodium salts.

We found that, in the reaction of propylene with a mercury salt, acetone is by-produced simultaneously with the production of acrolein and further investigated conditions to produce acetone. And now we have found the conditions under which acetone is produced selectively.

It is one object of this invention to produce acetone from propylene selectively.

It is another object of this invention to produce selectively acetone from propylene and a gas which contains oxygen. It is a further object of this invention to produce continuously acetone from propylene and the gas which contains oxygen.

Other objects and advantages of this invention will be apparent from the following description.

This invention provides a process for producing acetone from propylene which comprises introducing gaseous propylene into an acidic aqueous solution containing mercuric ions, nitrate ions and ferric ions and oxidizing propylene to acetone selectively in the liquid phase.

The oxidation or reaction in this process can be represented by the following equation:

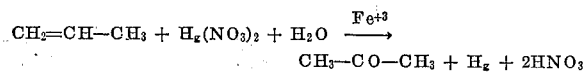

$$CH_2=CH-CH_3 + Hg(NO_3)_2 + H_2O \xrightarrow{Fe^{+3}} CH_3-CO-CH_3 + Hg + 2HNO_3$$

The concentration of mercuric ions in the aqueous solution is less than 1 A./l. (Atomic weight/liter), preferably in the range of 0.1 A./l. to 0.3 A./l.

The concentration of nitrate ions in the acidic aqueous solution is in the range of 20–300 times, preferably 40–100 times as much as the concentration of mercuric ions.

The concentration of ferric ions as cocatalyst is suitably in the range of 0.01–0.1 times as much as the concentration of mercuric ions.

As the source of mercuric ions, mercuric nitrate is suitably used. Nitrate ions in excess of the mercuric ions can be supplied from other nitrate salts and nitric acid. Such nitrate salts other than mercuric nitrate include sodium nitrate, potassium nitrate, calcium nitrate and ammonium nitrate.

The selective reaction of propylene to acetone is further promoted by the acidity of the aqueous solution due to nitric acid contained therein. The concentration of nitric acid in the aqueous solution is suitably in the range of 0.5–10 times as much as the concentration of mercuric ions.

The process may conveniently be carried out by introducing gaseous propylene together with a gas containing oxygen into an acidic aqueous solution containing mercury ions, nitrate ions and iron ions and oxidizing propylene to acetone selectively in the liquid phase.

Though metallic mercury which has been formed by reduction in the selective reaction of propylene to acetone may be oxidized by nitric acid present in the acidic aqueous solution to some extent, it is preferable that relatively large amounts of iron ions be used as the oxidation-reduction catalyst for mercury and that air or gaseous oxygen be employed as oxidizing agent for ferrous ions which have been formed by reduction.

Thus it is possible to operate continuously the selective reaction from propylene to acetone without any loss of mercuric ions. In the case of continuous operation of the reaction the concentration of all mercury ions in the acidic solution is less than 0.5 A./l., preferably in the range of 0.01 A./l. to 0.1 A./l., the concentration of nitrate ions is in the range of 20–300 times, preferably 40–100 times as much as the concentration of all mercury ions, and the concentration of total iron ions as cocatalyst and oxidation-reduction catalyst is suitably in the range of 0.05–150 times as much as the concentration of mercury ions. The ratio of propylene to oxygen in the gas containing oxygen is in the range of 1.1:1 to 4:1, preferably 1.1:1 to 2:1. When iron ions are used as oxidation-reduction catalyst, mercuric ions and mercurous ions coexist in the aqueous solution during the reaction in a certain proportion depending on the concentration of ferric ions. Accordingly mercurous ions also can be used as the source of mercuric ions.

The reaction temperature in the process of this invention is in the range of 40°–100° C., preferably 75–85° C. The product acetone leaves the reactor, accompanied by unreacted gas, and then may be absorbed in cold water, or caught in a cold trap.

The gaseous propylene as starting material can be introduced and absorbed into the acidic aqueous solution at about atmospheric pressure or under a partial pressure of propylene when mixed with gaseous oxygen or air.

In this process, not only pure propylene but also propylene diluted with or accompanied by oxygen, air or inert gases such as nitrogen may be used as starting material. And it is possible to carry out the reaction continuously and selectively. Therefore, the process of this invention is very convenient for industrialization.

It should be understood that the following examples merely illustrate the invention and do not limit it. Parts are expressed in terms of parts by weight.

Example 1

Using a glass cylindrical reactor having an inside diameter to height ratio of 1:6, into an aqueous solution containing 15 parts of water, 1.07 parts of mercuric nitrate, 0.051 part of ferric nitrate, 10 parts of sodium nitrate and 0.2 part of nitric acid, was introduced bubbling propylene gas at a feed rate of 6.0 parts per hour. The reaction temperature was maintained at 80° C. by means of a thermo-regulating bath and the reaction was continued for 2.5 hours. The product left the reactor, accompanied by unreacted gas, and then was absorbed in cold water. 0.19 part of acetone were obtained.

For comparison, the reaction was carried out under the same conditions as above except omitting ferric nitrate. The product was composed of 0.01 part of acetone, 0.04 part of acrolein and 0.001 part of propionaldehyde.

Example 2

Using the same apparatus as in Example 1 and employing an aqueous solution containing 15 parts of water, 1.07 parts of mercuric nitrate, 10 parts of sodium nitrate, 0.2 part of nitric acid and 0.028 part of iron alum, the reaction was carried out under the same conditions as in Example 1. 0.18 part of acetone were obtained.

Example 3

Using the same apparatus as in Example 1, into an aqueous solution containing 13 parts of water, 0.64 part of mercuric nitrate, 0.051 part of ferric nitrate, 12 parts of sodium nitrate and 0.2 part of nitric acid, was introduced a gaseous mixture of 10% propylene and 90% air by volume at a feed rate of 8.3 parts per hour. The reaction was carried out at 80° C. for 2 hours. 0.11 part of acetone were obtained.

Example 4

Using the same apparatus as in Example 1, into an aqueous solution containing 15 parts of water, 0.64 part of mercuric nitrate, 0.051 part of ferric nitrate, 12 parts of potassium nitrate and 0.25 part of nitric acid, was introduced a gaseous mixture of 10% propylene and 90% by volume at a feed rate of 8.3 parts hour. The reaction was carried out at 80° C. for 3 hours. 0.10 part of acetone and 0.002 part of acrolein were obtained.

For comparison, the reaction was carried out for 2 hours under the same conditions as above except omitting potassium nitrate. The reaction product was composed of 0.01 part of acetone, 0.015 part of acrolein and 0.005 part of propionaldehyde.

Example 5

Using the same apparatus as in Example 1, into an aqueous solution containing 18 parts of water, 0.195 part of mercuric nitrate, 10 parts of sodium nitrate, 4.8 parts of ferric nitrate and 0.25 part of nitric acid, was introduced a gaseous mixture of 50% propylene and 50% oxygen by volume at a feed rate of 8.8 parts per hour. The reaction was carried out at 80° C. In the first 7 hours were produced 0.12 part of acetone and even in the second 7 hours were produced the same amount of acetone was produced. This means the reaction rate does not decrease even after such a long period as 14 hours.

Example 6

Using the same apparatus as in Example 1, and employing an aqueous solution containing 18 parts of water, 0.18 part of mercurous nitrate, 4.8 parts of ferrous nitrate, 10 parts of sodium nitrate and 0.25 part of nitric acid, the reaction was carried out under the same conditions as in Example 5 and were obtained similar results as in Example 5.

It is apparent that various changes and modifications may be made without departing from the spirit of the invention. Accordingly, the scope of the invention should be limited only by the appended claims.

What is claimed is:
1. A process for producing acetone from propylene which comprises introducing gaseous propylene into an acidic aqueous solution containing mercuric ions, nitrate ions and ferric ions as a catalyst, the concentration of mercuric ions being less than 1 atomic weight per liter, the concentration ratio of nitrate ions to said mercuric ions being in the range of 20:1 to 300:1 and the concentration ratio of ferric ions to said mercuric ions being in the range of 0.01:1 to 0.1:1, and oxidizing propylene to acetone selectively in liquid phase at a temperature in the range of 40° to 100° C.
2. A process as claimed in claim 1 in which residual cations other than mercuric ions and ferric ions, nitrate ions comprise hydrogen ions and ions selected from the group consisting of sodium ions, potassium ions, calcium ions, ammonium ions and mixture thereof.
3. A process as claimed in claim 2 in which the concentration ratio of hydrogen ions to mercuric ions is in the range of 0.5:1 to 10:1.
4. A process as claimed in claim 1 in which gaseous propylene together with an oxygen containing gas is introduced into the acidic aqueous solution.
5. A process as claimed in claim 4 in which mercurous ions are employed with the mercuric ions, and ferrous ions are employed with the ferric ions.
6. A process as claimed in claim 5 in which the concentration of all mercury ions is less than 0.5 atomic weight per liter, the concentration ratio of nitrate ions to said mercury ions is in the range of 20:1 to 300:1, and the concentration ratio of all iron ions to said mercury ions is in the range of 0.05:1 to 150:1.
7. A process as claimed in claim 4 in which the oxygen containing gas is gaseous oxygen.
8. A process as claimed in claim 4 in which the oxygen containing gas is air.
9. A process as claimed in claim 4 in which the ratio of propylene to oxygen is in the range of 1.1:1 to 4:1.
10. A process as claimed in claim 4 in which the reaction temperature is in the range of 75° C. to 85° C.
11. A process as claimed in claim 1 in which the reaction temperature is in the range of 75° C. to 85° C.

References Cited

UNITED STATES PATENTS 3,172,914   3/1965   Fujiwara et al. _____ 260—597

FOREIGN PATENTS 237,986   4/1959   Australia.

LEON ZITVER, *Primary Examiner.*

M. M. JACOB, *Assistant Examiner.*

U.S. Cl. X.R.

260—604